(12) United States Patent
Lowman et al.

(10) Patent No.: US 7,220,031 B1
(45) Date of Patent: May 22, 2007

(54) AUTOMOBILE WHEEL LIGHTING SYSTEM

(76) Inventors: Jason Lowman, 3118 Legends Cir., Lakeland, FL (US) 33803; Randal Williams, 3227 Henson Ave., Annapolis, MD (US) 21403; Scott Mongeon, 4425 Roundup Dr., Polk City, FL (US) 33868

(*) Notice: Subject to any disclaimer, the term of this patent is extended or adjusted under 35 U.S.C. 154(b) by 169 days.

(21) Appl. No.: 11/065,685

(22) Filed: Feb. 24, 2005

(51) Int. Cl.
*B60Q 1/00* (2006.01)
*B60Q 1/26* (2006.01)

(52) U.S. Cl. .......................... 362/500; 362/35; 362/42

(58) Field of Classification Search ................ 362/35, 362/42, 500; 40/587
See application file for complete search history.

(56) References Cited

U.S. PATENT DOCUMENTS

| | | | |
|---|---|---|---|
| 1,498,502 A | 6/1924 | Baer | |
| 3,767,909 A * | 10/1973 | Bell | 362/500 |
| 3,947,677 A * | 3/1976 | Steinle | 362/506 |
| 4,042,816 A * | 8/1977 | Smoot | 362/506 |
| 4,238,816 A | 12/1980 | Merlo | 362/277 |
| 4,802,069 A * | 1/1989 | Chandler | 362/506 |
| 5,548,274 A * | 8/1996 | Anderson et al. | 340/468 |
| 5,558,426 A | 9/1996 | Cabanatan et al. | 362/78 |
| 6,168,301 B1 | 1/2001 | Martinez | 362/500 |
| 6,332,700 B1 * | 12/2001 | Baines | 362/486 |
| 6,422,724 B1 | 7/2002 | Monteiro | 362/486 |
| 6,533,442 B2 | 3/2003 | Eichhorn | 362/511 |
| 6,945,679 B2 * | 9/2005 | Young | 362/500 |
| 2006/0158893 A1 * | 7/2006 | Wilkerson | 362/500 |

* cited by examiner

*Primary Examiner*—Sandra O'Shea
*Assistant Examiner*—Jason Moon Han
(74) *Attorney, Agent, or Firm*—Goldstein Law Offices P.C.

(57) ABSTRACT

An automobile wheel lighting system, for use in an automobile having a battery, wheels, and a wheel well associated with each wheel. A fixed connector is mounted within each wheel well and is electrically connected to the battery. At least one lighting assembly is used to selectively illuminate one of the wheels. Each lighting assembly includes a mating connector, a lighting head having an LED and a reflector assembly, and a flexible cord extending between the mating connector and lighting head. The mating connector is secured within the fixed connector in the wheel well adjacent to the wheel to be illuminated, and the cord extended outwardly from the automobile and flexed to direct the lighting head toward the wheel.

3 Claims, 5 Drawing Sheets

US 7,220,031 B1

AUTOMOBILE WHEEL LIGHTING SYSTEM

BACKGROUND OF THE INVENTION

The invention relates to an automobile wheel lighting system. More particularly, the invention relates to a light assembly that selectively attaches adjacent one of the wheels to illuminate that wheel.

Conventional automotive lights do not illuminate the outside of the automobile. Interior lights illuminate dashboard gauges, controls, and displays. Headlights project outwardly to light the road ahead. A vehicle's taillights warn other vehicles of the presence of the vehicle. Turn lights signal other vehicles of the intention of the driver. Few conventional lights, however, are intended to illuminate exterior surfaces of the automobile. With the exception of license plate lights then, the exterior of the automobile remain substantially un-lit.

Many automobile owners customize the appearance of their vehicle by selecting custom design wheels or rims to replace the "stock" wheels provided by the manufacturer. At night, however, the flash and appeal of the custom rims is largely lost as the automobile rims rotate silently in the dark.

In addition, the lack of illumination can be hazardous when emergency repairs are necessary. In particular, a flat tire on a dark road can be nearly impossible to fix. Without another person standing-by holding a flashlight, the act of changing a tire can involve significant fumbling in the dark, and can even be dangerous.

U.S. Pat. No. 5,558,426 to Cabanatan et al. discloses an aerodynamic wheel lights for illuminating the wheels of an automobile. Cabanatan et al., however, discloses a hardwired system that employs a rigid arm that is attached to the frame of the automobile near each respective wheel.

U.S. Pat. No. 1,498,502 to Baer discloses an automobile safety light that is mounted on the fender. Baer, however, is intended on warning of the vehicle's position, and thus directs its light outwardly.

U.S. Pat. No. 6,168,301 to Martinez et al. discloses a wheel luminaire. In particular, Martinez et al. disclose a device that mounts within a wheel, and derives its power from the automobile using a brush and contact ring arrangement.

U.S. Pat. No. 6,422,724 to Monteiro, and U.S. Pat. No. 6,533,442 to Eichhorn et al. both disclose portable lighting devices for vehicles.

While these units may be suitable for the particular purpose employed, or for general use, they would not be as suitable for the purposes of the present invention as disclosed hereafter.

SUMMARY OF THE INVENTION

It is an object of the invention to provide a wheel lighting system that illuminates the wheels of an automobile. Accordingly, the lighting system includes at least one light assembly that extends from the automobile and directs light at one of the wheels.

It is another object of the invention to provide a wheel lighting system that allows a user to easily connect and disconnect the lighting assemblies. Accordingly, a fixed connector is mounted to the automobile adjacent each wheel and is electrically connected to the automobile electrical system. The lighting assembly has a mating connector that facilitates easy connection and disconnection with the fixed connector.

It is a further object of the invention to provide a lighting system that allows one of the lighting assemblies to be connected adjacent one of the tires, when needed, for changing that tire or effecting emergency repairs. Accordingly, the present invention provides fixed connectors within the wheel wells, so that the light assembly can be attached thereat by simply securing the mating connector within the fixed connector and thereby illuminating the wheel and region immediately therearound.

The invention is an automobile wheel lighting system, for use in an automobile having a battery, wheels, and a wheel well associated with each wheel. A fixed connector is mounted within each wheel well and is electrically connected to the battery. At least one lighting assembly is used to selectively illuminate one of the wheels. Each lighting assembly includes a mating connector, a lighting head having an LED and a reflector assembly, and a flexible cord extending between the mating connector and lighting head. The mating connector is secured within the fixed connector in the wheel well adjacent to the wheel to be illuminated, and the cord extended outwardly from the automobile and flexed to direct the lighting head toward the wheel.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
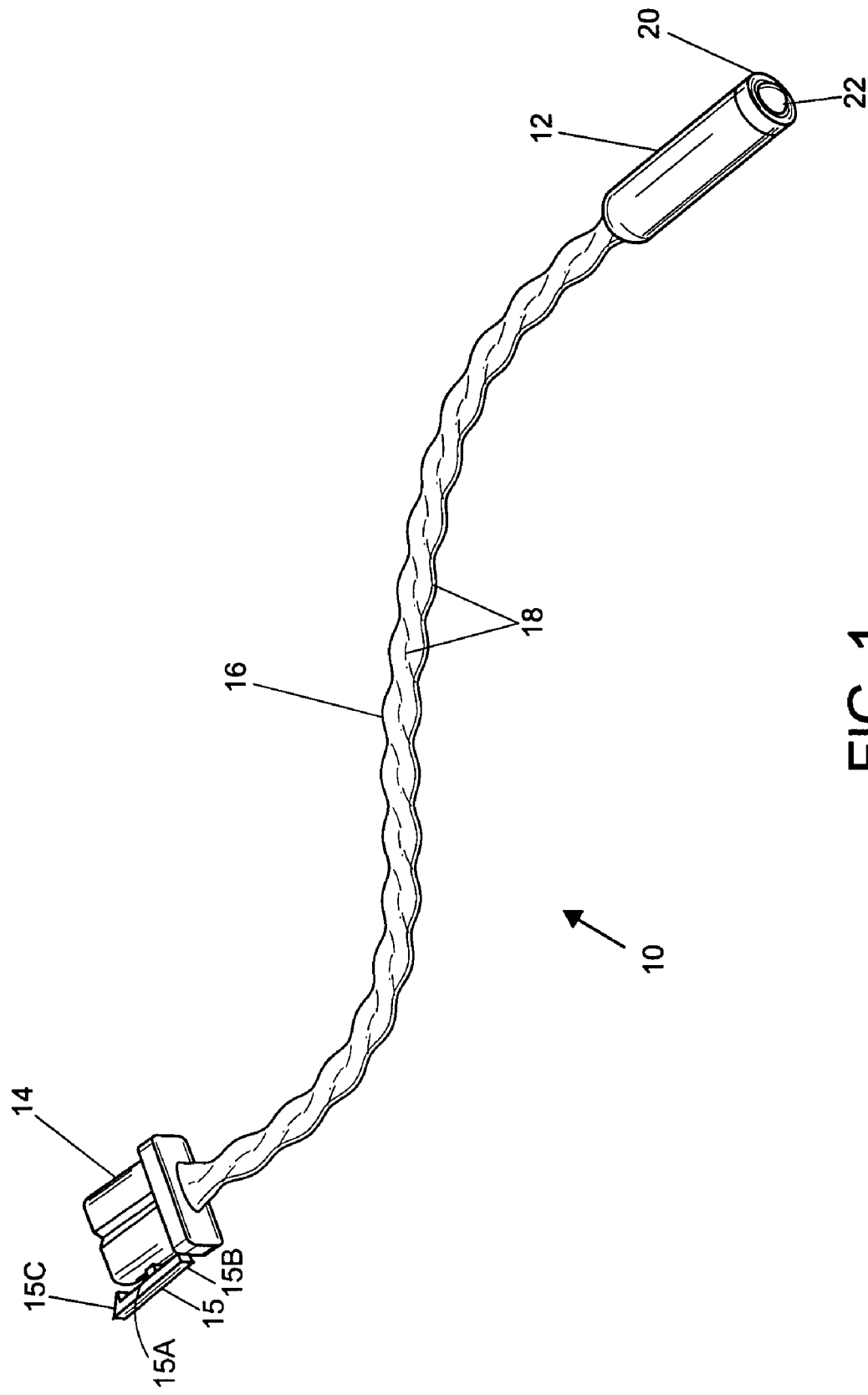
FIG. 1 is a diagrammatic perspective view, illustrating an embodiment of the present invention, where the twisted wire is not covered by shrink tubing or a braided sheath.

FIG. 1 illustrates a lighting assembly 10 according to the present invention. The lighting assembly includes a lighting head 12, a mating connector 14, and a flexible cord 16 extending between the lighting head 12 and mating connector 14. The flexible cord 16 includes a pair of wires 18 that are preferably twisted tightly together for strength and flexibility. The pair of wires 18 electrically connect the lighting head 12 and connector 14.

The lighting head 12 includes a reflector assembly 20, and an LED 22. It should be noted that the LED 22 may be recessed within the reflector assembly 20. The LED is in fact electrically connected to the mating connector 14 with the wires 18. In addition, a current limiting resistor is preferably provided within the lighting head 12 to prevent damage to the LED when it is connected a standard twelve volt supply. The reflector assembly 20 is preferably constructed to direct light from the LED 22 in a fairly narrow pattern so that it provides "spot" illumination of significant intensity.

Figure 2:
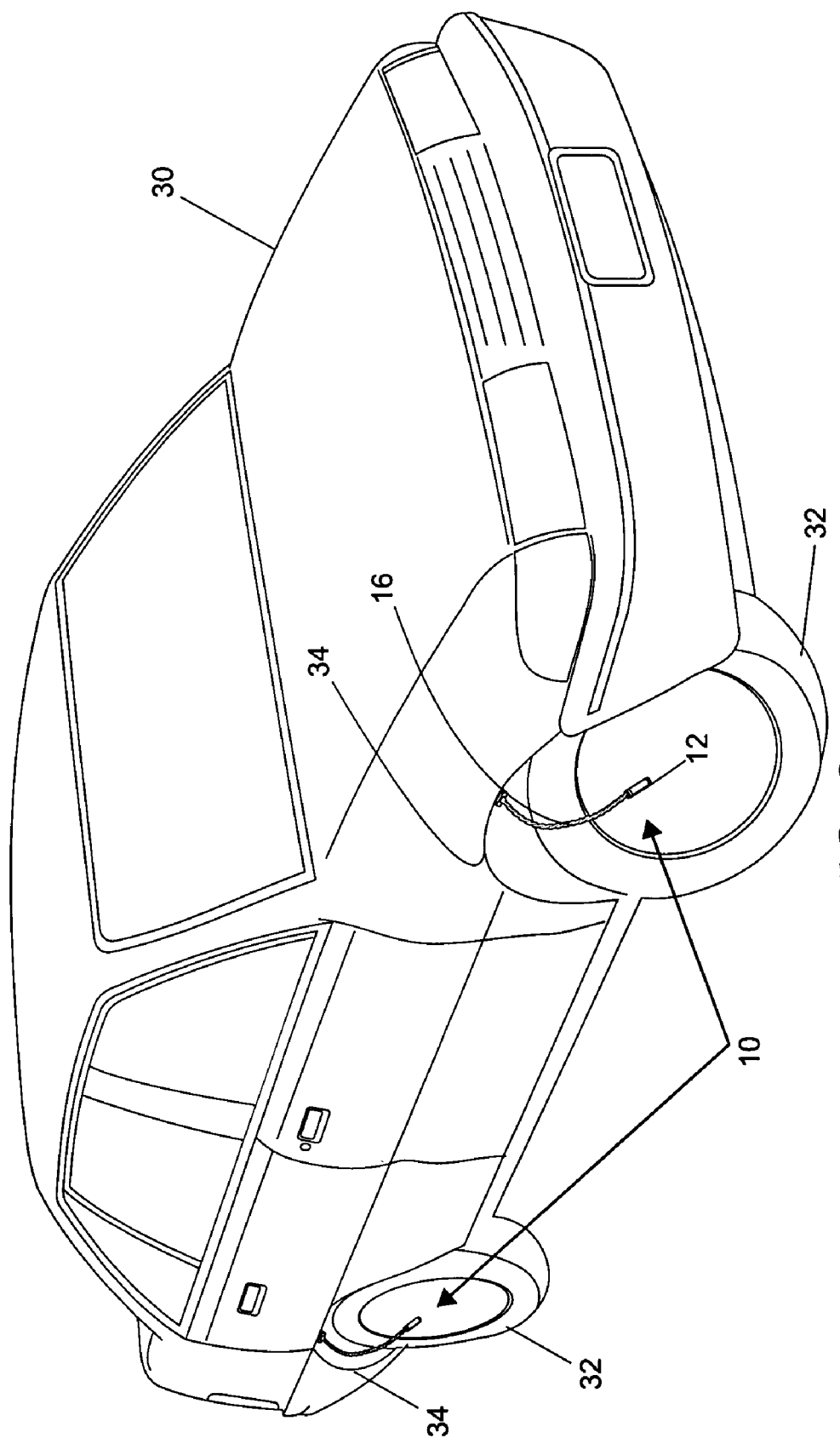
FIG. 2 is a diagrammatic perspective view, illustrating an automobile embodying the present invention, wherein one of the light assemblies is attached in the wheel well adjacent to each of the wheels and is directed thereat.

FIG. 2 illustrates an automobile 30 having a wheel lighting system according to the present invention. In particular, the automobile 30 has four wheels 32, and a wheel well 34 adjacent each wheel 32. As illustrated in FIG. 2, one of the lighting assemblies 10 is connected within each of the wheel wells 34, and the cord 16 has been adjusted so that the cord 16 projects and extends outwardly from the wheel well 34 and the lighting head 12 is directed toward the wheel 32 associated with said wheel well 34.

Figure 3:
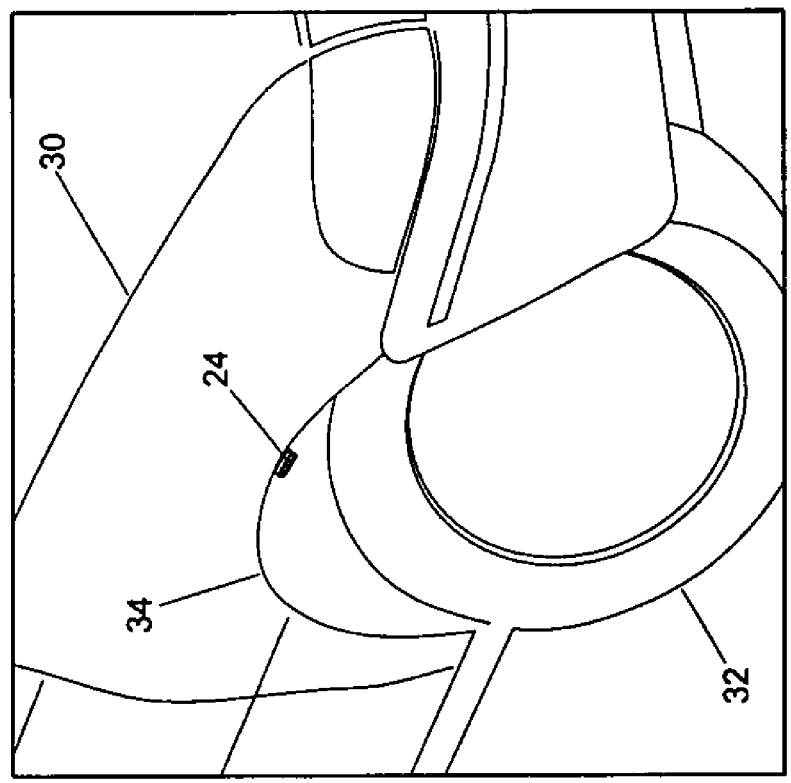
FIG. 3 is a diagrammatic perspective view, illustrating one of the wheel wells, wherein the fixed connector is located.

FIG. 3 illustrates a portion of the automobile 30 immediately adjacent to the wheel well 34. In particular, a fixed connector 24 is mounted inside the wheel well 34. In particular the fixed connector 24 is preferably mounted at a highest point inside the wheel well 34. The automobile 30 can be used in a normal fashion, and the fixed connector 24 remains in place until illumination of the wheel 32 is desired.

Figure 4:
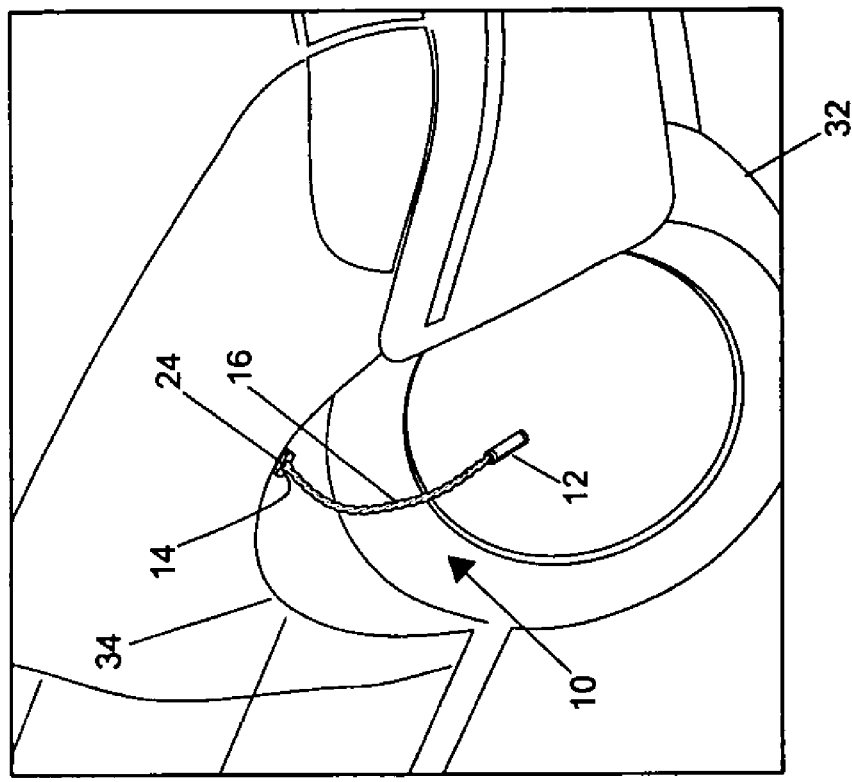
FIG. 4 is a diagrammatic perspective view, similar to FIG. 3, wherein the lighting assembly has been secured in the wheel well by attaching the mating connector to the fixed connector, thereby illuminating the wheel.

Referring then to FIG. 4, when it is desired to illuminate the wheel 32, one of the lighting assemblies 10 is attached in the adjacent wheel well 34 by securing the mating connector 14 to the fixed connector 24 located thereat. Then, the cord 16 can be flexed to adjust the lighting head 12, to suitably direct the lighting head 12 for providing the desired lighting effect on the wheel 32. The lighting assembly may be used to create an aesthetic lighting effect for the wheel 32, or may be used for more functional purposes, such as for providing needed light to an area proximity to the wheel 32 and wheel well 34, such as when effecting an emergency repair or changing one of the wheels 32 that has a flat tire mounted thereon.

Referring back to FIG. 1, it is preferred that the mating connector 14 is configured to engage the fixed connector 24 in such a manner that prevents them from becoming disconnected as the vehicle is driven. In particular, it is preferable that there be a locking mechanism that prevents the fixed connector 24 and mating connector 14 from simply sliding apart, and instead requires an active step to disengage the connectors 14, 24. Accordingly, the mating connector 14 has an engagement hook 15 that includes a fulcrum 15A, a handle 15B, and a hooked end 15C. The hooked end 15C engages a catch on the fixed connector 24 as the fixed connector 24 and mating connector 14 are brought together. To release the mating connector 14 from the fixed connector 24, the user presses the handle 15B to free the hooked end 15C from the fixed connector 24, and then the mating connector 14 and fixed connector 24 can be pulled apart.

Figure 5:
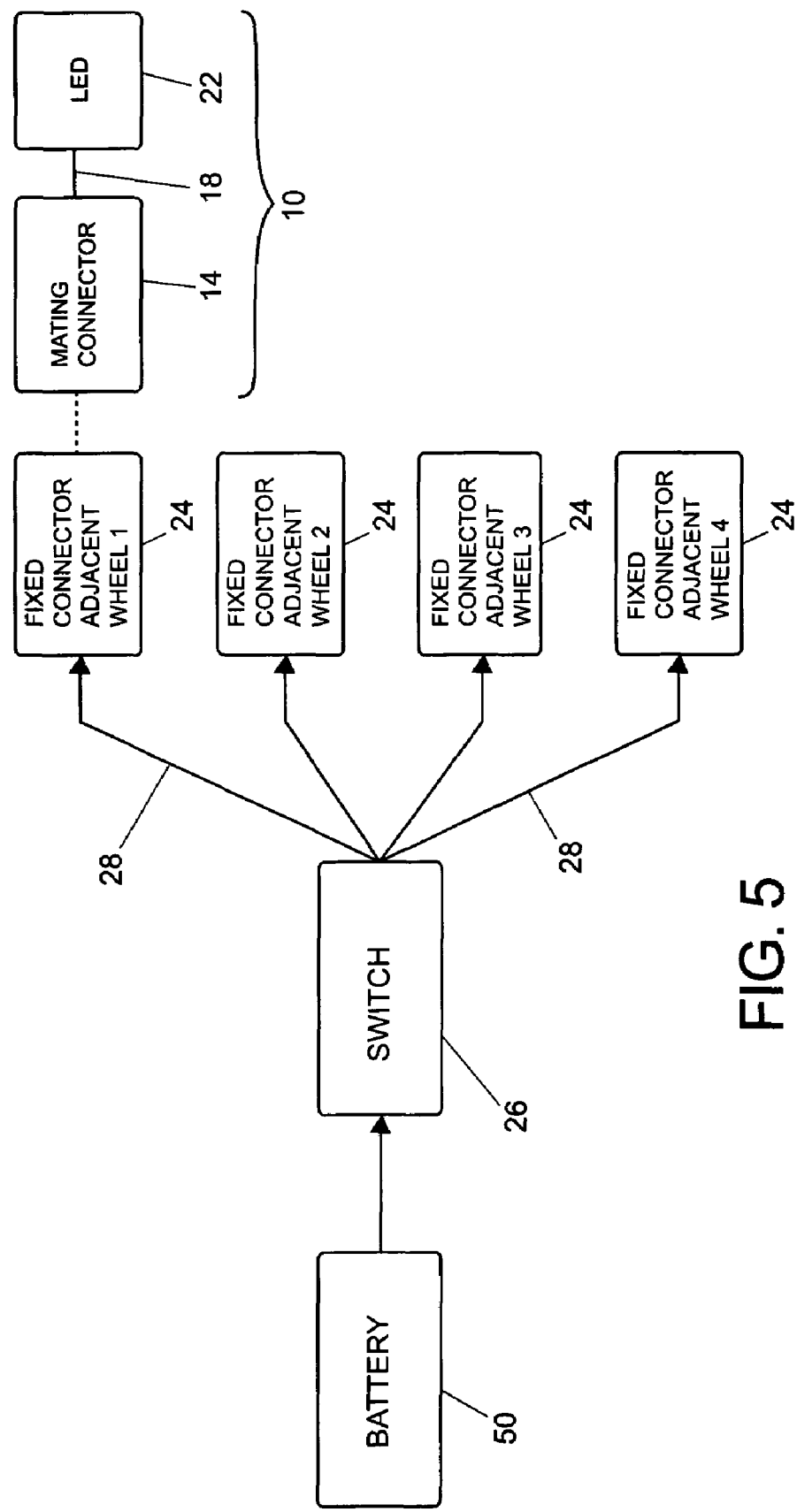
FIG. 5 is a functional block diagram, illustrating interconnection of the present invention to the vehicle electrical system.

Referring to FIG. 5, the lighting system is connected to a battery 50, which is a simplified representation of an automobile electrical system. The battery 50 supplies power to a switch 26 which is used to selectively power the system and supply power to the lighting assemblies 10 when activated. Through in vehicle wiring 28, power is supplied to the fixed connectors 24, which are mounted at distributed positions within the automobile 30—most particularly within each wheel well. When desired, one of the mating connectors 14 for one of the lighting assemblies 10 is secured within one of the fixed connectors 24 to provide power to the LED 22 thereof through the pair of wires 18. In addition, a fuse may be interposed between the battery 50 and switch 26 to prevent damage to the lighting system components.

Figure 6:
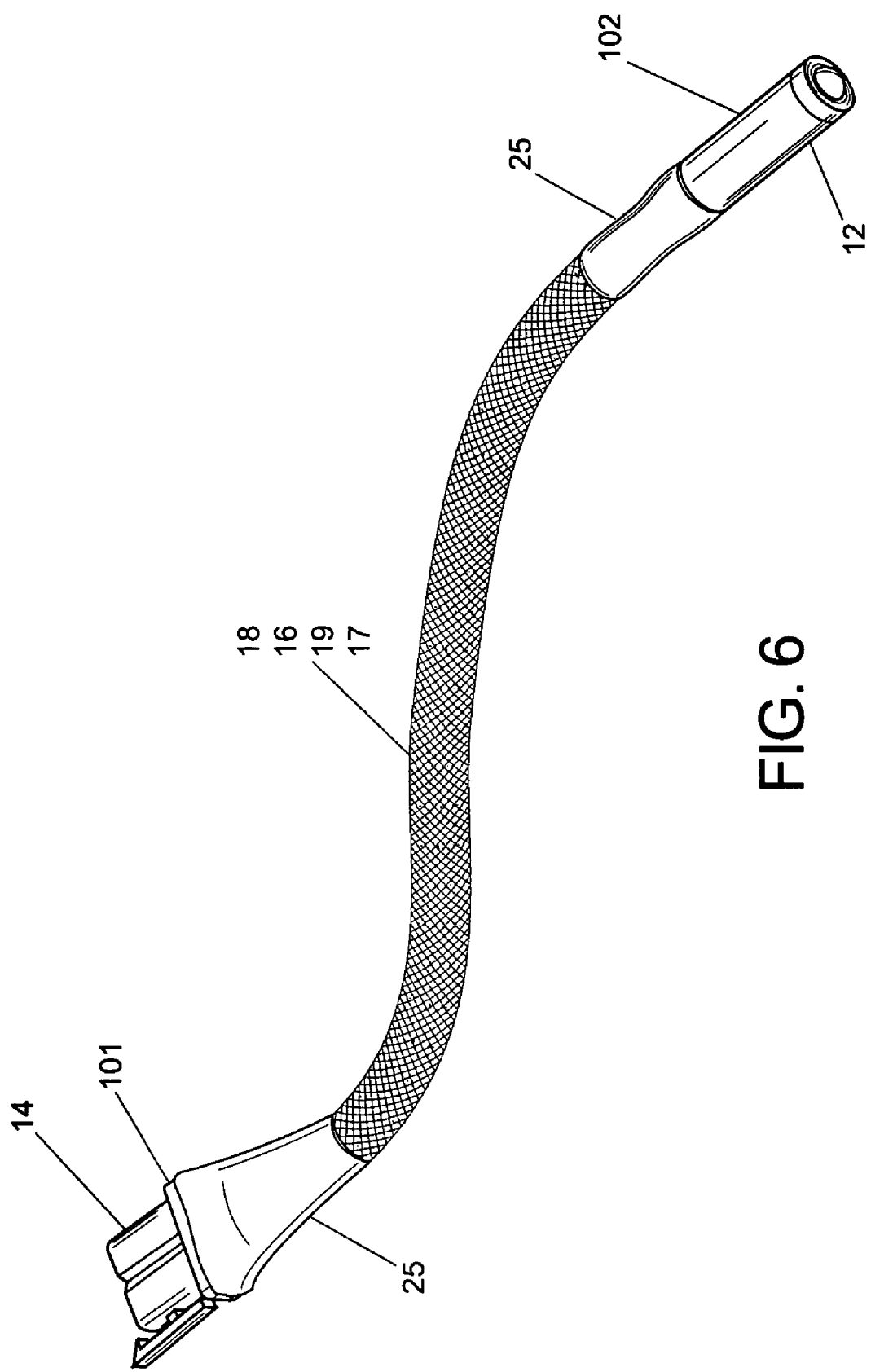
FIG. 6 is a diagrammatic perspective view, illustrating a preferred embodiment of the present invention.

Referring now to FIG. 6, a preferred embodiment of one of the lighting assemblies 10 is disclosed. In particular, the pair of wires 18 of the cord 16 having been covered with thin shrink tubing 19, which in turn has been covered with a braided sleeve 17. In addition, the lighting assembly 10 has a first end 101 having the mating connector 14, and a second end 102 having the lighting head 12. Large shrink tubing 25 has been used at the first end 101 to transition and seal the connection between the mating connector 14 and the cord 16, and at the second end 102 to transition and seal the connection between the cord 16 and lighting head 12.

In conclusion, herein is presented a wheel lighting system, for use in an automobile, for selectively lighting one or more of the wheels when desired by securing one of the lighting assemblies into one of the fixed connectors. The invention is illustrated by example in the drawing figures, and throughout the written description. It should be understood that numerous variations are possible, while adhering to the inventive concept. Such variations are contemplated as being a part of the present invention.

What is claimed is:

1. An automotive wheel lighting system, comprising:
   an automobile having a battery, four wheel wells, four wheels, each wheel associated with one of the wheel wells;
   a fixed connector associated with each wheel, the connector mounted within the wheel well associated with said wheel, the connector electrically connected to the battery; and
   four lighting assemblies, each lighting assembly associated with one of the wheels of the automobile, each lighting assembly having a mating connector, a lighting head, and a flexible cord extending between the mating connector and the lighting head for allowing the lighting head to project outwardly of the automobile, wherein each lighting head has a reflector assembly and an LED that is electrically connected to the mating connector with a pair of wires extending through the cord, and wherein the lighting assembly is selectively attachable and removable from the automobile for selectively illuminating one of the wheels by selectively securing the mating connector of the lighting assembly to one of the fixed connectors at the wheel to be illuminated, and using the flexible cord to project the lighting head outwardly from the automobile so that the lighting head can be oriented back toward said wheel.

2. The automobile wheel lighting system as recited in claim 1, wherein the pair of wires are twisted for strength and flexibility and are covered with a braided sleeve for additional strength and durability.

3. The automobile wheel lighting system as recited in claim 2, wherein each lighting assembly has a first end having the mating connector and a second end having the lighting head, and wherein the mating connector is secured to the cord with shrink tubing and the lighting head is also secured to the cord with shrink tubing.

* * * * *